J. A. BRITTON.
FUEL GAGE FOR AUTOMOBILES.
APPLICATION FILED JULY 6, 1914. RENEWED FEB. 26, 1917.
1,226,618.
Patented May 15, 1917.
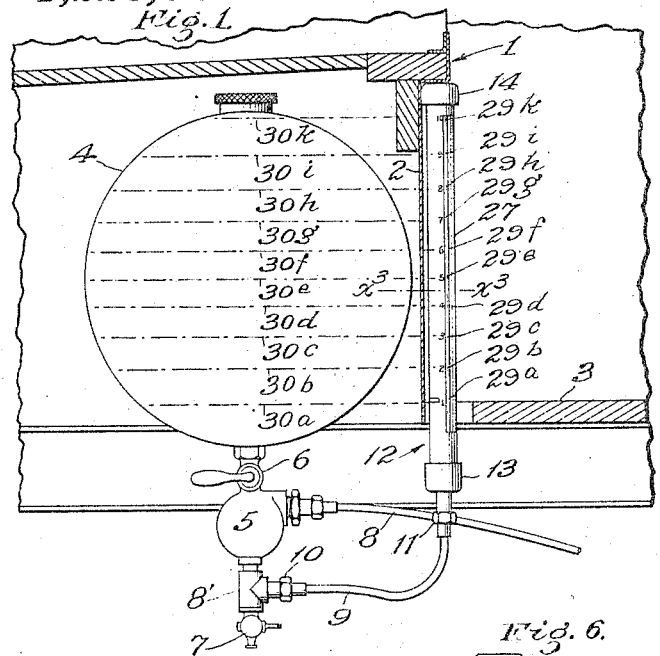
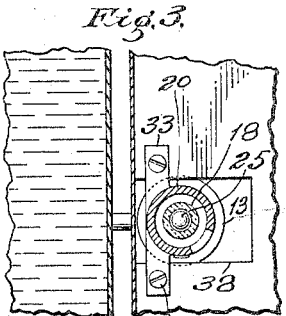
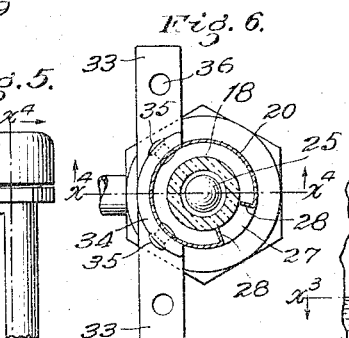
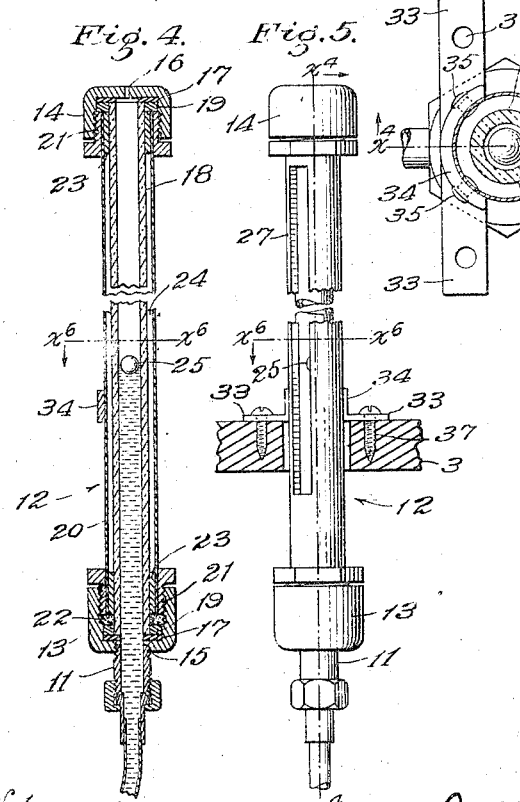
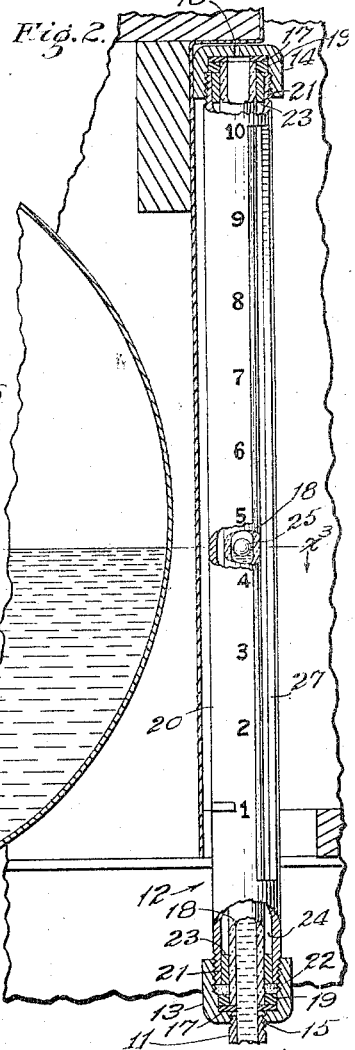
Witnesses
W. N. Kirkby
L. Belle Weaver
Inventor
Jarvis A. Britton
by James R. Townsend
his atty

UNITED STATES PATENT OFFICE.

JARVIS A. BRITTON, OF LOS ANGELES, CALIFORNIA, ASSIGNOR TO THE NATIONAL MOTOR SUPPLY COMPANY, OF CLEVELAND, OHIO, A CORPORATION.

FUEL-GAGE FOR AUTOMOBILES.

1,226,618.            Specification of Letters Patent.      Patented May 15, 1917.

Application filed July 6, 1914, Serial No. 849,286.    Renewed February 26, 1917. Serial No. 151,143.

*To all whom it may concern:*

Be it known that I, JARVIS A. BRITTON, a citizen of the United States, residing at Los Angeles, in the county of Los Angeles and State of California, have invented a new and useful Fuel-Gage for Automobiles, of which the following is a specification.

In Ford cars of the present construction, the fuel tank is contained within the front seat of the car and an object of this invention is to provide a sight-float gage whereby the driver or attendant of such cars can readily advise himself as to the amount of fuel contained in the tank and to so construct and arrange the gage that it will be practically out of the way of the driver and passengers of the car and can always be easily read by the attendant while filling the tank as well as at other times when the light is sufficient, and without removing the cushion or filler cap or disturbing the occupants of the car.

An object is to so construct the device that it can be attached to the car easily and quickly and without it being necessary to drain.

An object is to make provision for so constructing, connecting and locating the gage that indication will be practically correct in all road positions of the car as well as when in the garage.

Other objects are freedom from liability of leakage combined with simplicity and low cost of production.

Further objects and advantages may appear as the invention is unfolded in detail in the subjoined description.

The accompanying drawings illustrate various embodiments of the invention:—

Figure 1 is a fragmental view showing one embodiment of the invention applied to a car, a fragment of which is shown in section.

Fig. 2 is an enlarged view of some of the parts in Fig. 1, the tank and portions of the gage being shown in section.

Fig. 3 is a plan section on line indicated by $x^3$, Figs. 1 and 2.

Fig. 4 is a broken sectional elevation on line indicated by $x^4$, Figs. 5 and 6 of a slightly different embodiment of the invention than shown in the preceding figures.

Fig. 5 is a side elevation of Fig. 4.

Fig. 6 is an enlarged plan section on line indicated by $x^6$, Figs. 4 and 5.

Arrows on the section lines of the different views indicate the direction of sight.

The construction shown in Figs. 1 to 6 will first be described.

The construction embodying a seat 1 with riser 2, a floor 3, a cylindrical fuel tank 4, a strainer sediment bulb or cup 5, a shut-off valve 6, a drain cock 7 and a carbureter pipe line 8 is typical of the form of automobile known to the trade as the Ford car and is used in this instance for illustrating the invention because of the perfect adaptability of the invention to said car, it being understood that the invention is not confined strictly to application to Ford cars but that the invention may be used, possibly with slight modifications, to adapt it to other than Ford cars.

The drain cock 7 has heretofore been attached directly to the drain cup 5 but for the purpose of this invention I remove the drain cup and fasten it to a T 8' which I attach to the drain cup 5 and said T is provided with a somewhat flexible L-shaped tube or pipe 9 of copper or the like which is connected at one end to the T by a union 10 and which is connected at its other end by a union 11 to my novelly constructed and novelly arranged direct reading gage 12 that will now be described.

The gage 12 is provided with lower and upper end caps 13, 14, the cap 13 having a threaded orifice 15 to receive the union 11, and the cap 14 being provided with an air vent 16. The caps 13, 14 are practically alike with the exception of the comparative sizes of the orifice 15 and vent 16, and they are provided inside with orificed washers 17 of leather, or the like, against which rest the ends of a transparent gage-tube 18 that may be of glass, there being other washers 19 of leather or the like surrounding the gage-tube and flush with the ends thereof.

The caps 13, 14 are held toward one another so as to support the gage-tube 18 and to press the ends of the gage-tube tightly against the washers 17 by a substantially cylindrical shell 20 provided at the ends with screw-threaded portions 21 which may be integral with the shell as in Fig. 2 or may be separate as in Fig. 4 and which are screw-threaded into the caps 13, 14 respectively, there being packing 22 that may be made of string coated with shellac and that surrounds the gage-tube 18 between the lower end of the shell 20 and the washer 19 in the cap 13.

The shell 20 in Fig. 4 is fastened to the threaded portions 21 by any suitable means or process as by sweating and at the same time spacing sleeves 23 are also sweated inside the ends of the shell 20, said sleeves just nicely fitting around the gage-tube 18. The spacing sleeves 23 are used for all of the forms.

By this construction, the sleeves 23 are flush with the respective ends or threaded portions 21 of the shell 20 to form perfect seats for the packing 22 so as to make a perfectly tight connection and avoid leakage, especially at the lower end, tightness at the upper end not being of paramount importance; and the sleeves 23 also serve to slightly space apart the gage-tube 18 and shell 20 for the reason hereinafter set forth.

It is thus seen that the caps 13, 14, shell 20 and threaded portions 21 together form a protecting holder or sheath for the gage-tube 18.

It is understood that the shell 20 may be constructed of pipe cut into suitable lengths, a tubular casting as in Figs. 1 to 3 or sheet metal cut or stamped and then rolled to a cylindrical form as in Figs. 4 to 6.

The shell 20 is provided with a white inside face 24 and an indicator is provided in the form of a spherical sight-float 25 which may be of cork dyed a suitable color, preferably red, and coated with shellac.

The sight-float 25 is made spherical so as to minimize the friction between it and the gage-tube 18 and eliminate any tendency of the sight-float to stick in the gage-tube, thus insuring perfect free-floating and level-registering of the sight-float.

The shell 20 is provided longitudinally with a sight slot 27 which in the form shown in Figs. 4 to 6 is cut or stamped out and which may be milled out if the shell is of pipe.

In the form shown in Figs. 4 to 6 the side margins of the slot 27 are bent inward to form flanges 28 which extend substantially to the gage-tube 18 so as to give an idea of comparatively great thickness of the shell 20 and at the same time reinforce said margins against any force tending to bend them inward, the spacing apart hereinbefore noted of the gage-tube 18 and shell 20 being for this purpose.

The shell 20 is provided with quantative graduations $29^a$, $29^b$, $29^c$, $29^d$, $29^e$, $29^f$, $29^g$, $29^h$, $29^i$, $29^k$ representing the capacity in gallons of the tank 4 from the bottom of the tank to the various quantative levels $30^a$, $30^b$, $30^c$, $30^d$, $30^e$, $30^f$, $30^g$, $30^h$, $30^i$, $30^k$ respectively; said graduations reading from the bottom of the tube toward the top and being the numerals one to ten inclusive which are located exactly in the horizontal planes of said levels, so that when the tank contains one gallon of fuel the fuel level in the gage-tube 18 will be exactly at the numeral one and other amounts of fuel in the tank will be correspondingly indicated by the numerals two to ten inclusive.

The distances apart of adjacent graduations $29^a$ to $29^k$ inclusive correspond to the distances apart of adjacent levels $30^a$ to $30^k$ respectively, and said distances decrease from the bottom and top of the tank toward the center according as the tank increases in width from said bottom and top toward the center.

In Figs. 1 to 6 the graduations are on the side of the shell 20 on the left-hand margin of the slot 27 and can only be read to advantage from that side.

The shell 20 is provided at a little distance above its lower end with diametrically opposite fastening lugs 33 which may be integral with the shell 20 as in Fig. 3 or fastened by any suitable means such as a semi-cylindrical collar 34 and rivets 35.

The lugs 33 are provided with perforations 36 to receive fastening screws 37 or the like which are screwed into the floor 3.

It is believed that the foregoing detailed description will enable those skilled in the art to make the device and apply it to a car and put said device in working condition.

I claim:—

A gage comprising a transparent tube, lower and upper screw threaded caps at the respective ends of the tube, said upper cap having a vent, a cylindrical sheet metal slotted shell surrounding the tube, threaded portions fastened to the opposite ends of the shell and screwed into the caps, spacers between the tube and the shell and flush with the ends of the shell, and washers between the flush ends of the shell and spacers and the inside ends of the caps.

In testimony whereof, I have hereunto set my hand at Los Angeles, California, this 30th day of June 1914.

JARVIS A. BRITTON.

In presence of—
JAMES R. TOWNSEND,
GEORGE H. HILES.